No. 881,590. PATENTED MAR. 10, 1908.
H. JACOB.
MOUNTING OF SIGHTING TELESCOPES.
APPLICATION FILED JULY 24, 1906.
2 SHEETS—SHEET 1.
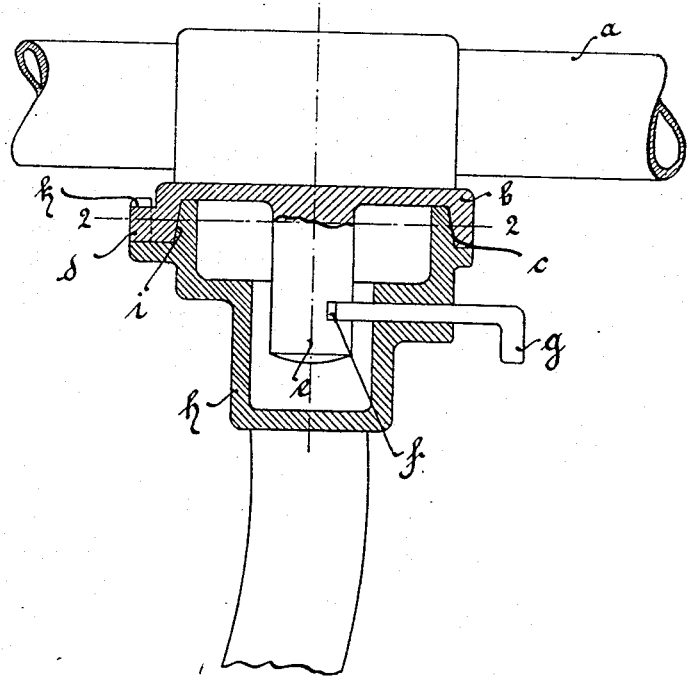

No. 881,590.  
PATENTED MAR. 10, 1908.  
H. JACOB.  
MOUNTING OF SIGHTING TELESCOPES.  
APPLICATION FILED JULY 24, 1906.
2 SHEETS—SHEET 2.
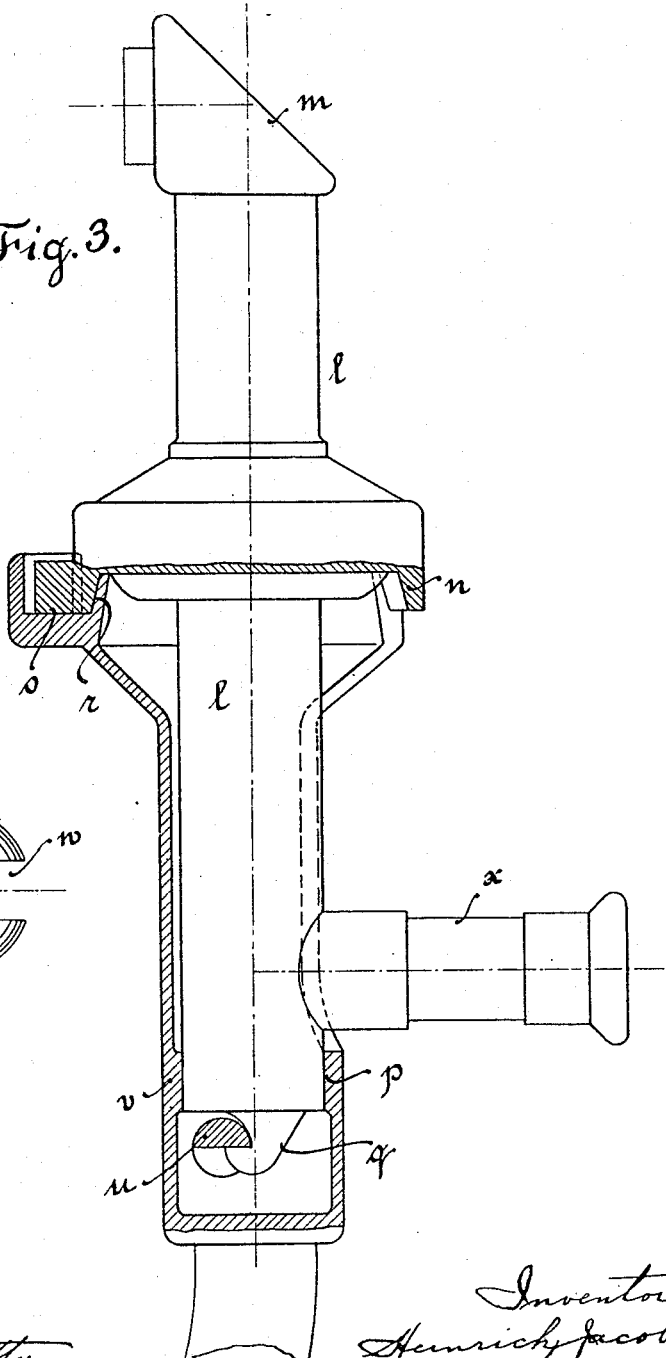
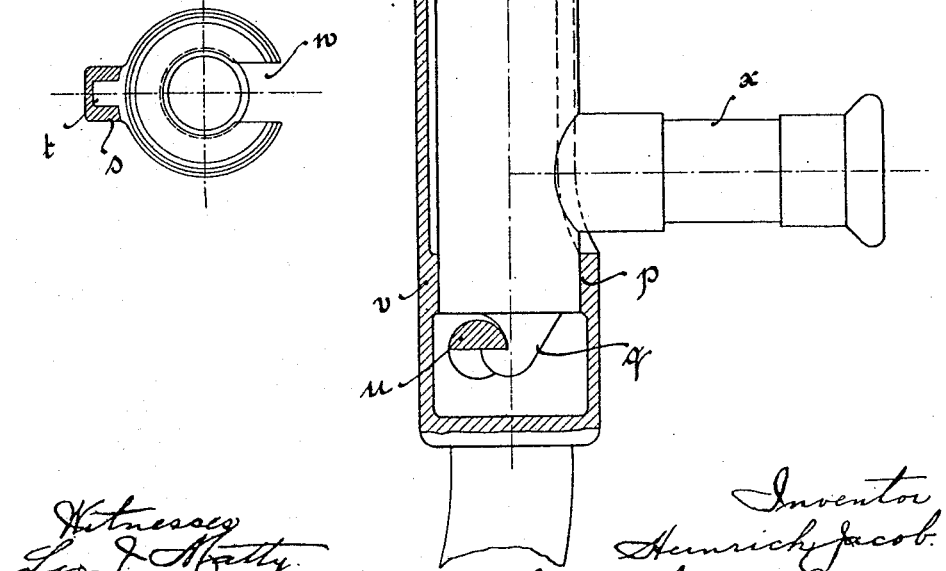

UNITED STATES PATENT OFFICE.

HEINRICH JACOB, OF FRIEDENAU, NEAR BERLIN, GERMANY, ASSIGNOR TO THE FIRM OF OPTISCHE ANSTALT C. P. GOERZ AKTIENGESELLSCHAFT, OF FRIEDENAU, NEAR BERLIN, GERMANY.

MOUNTING OF SIGHTING-TELESCOPES.

No. 881,590.　　　Specification of Letters Patent.　　　Patented March 10, 1908.

Application filed July 24, 1906. Serial No. 327,475.

*To all whom it may concern:*

Be it known that I, HEINRICH JACOB, a citizen of the German Empire, and resident of Friedenau, near Berlin, Germany, engineer, have invented certain new and useful Improvements in the Mounting of Sighting-Telescopes, of which the following is a specification.

This invention relates to improvements in the mounting of sighting telescopes, and more particularly in the mounting thereof on ordnance, machine guns and the like, the purpose of the invention being to secure reliable connection of a sighting telescope to its support and to provide the former with circular bearing surfaces which can be very accurately constructed without difficulty. The employment of circular bearing-surfaces is more particularly of great importance in connection with panoramic telescopes, since in the case of the latter the ordinary connection of the instrument to its support by means of dovetailed bars can only with great difficulty be made so exact that the bars are parallel with the optical axis of the instrument and the axis of rotation of the reflector.

If the instrument is provided with circular bearing surfaces the support, for example the training head or rack bar or the like, in which the telescope is to be mounted must also be provided with circular bearing surfaces. To prevent rotation and removal of the instrument after it has been mounted, stop-members are provided adapted to interlock the support and the telescope such as abutments or the like, at least one part of said stop-members being adapted to be adjusted into locking-position and out of locking-position.

The invention is illustrated in the annexed drawing by means of two examples, Figure 1 being a side-view of an ordinary sighting telescope and the improved support and bearing, partly in section. Fig. 2 is a horizontal section on the line 2—2 of Fig. 1, and Fig. 3 a side-view of a panoramic telescope mounted on the rack bar of a gun, the bearing of the instrument being shown in section. Fig. 4 is a horizontal section of the upper part of the bearing, on a smaller scale.

Referring to Fig. 1, $a$ represents a portion of the sighting-telescope, to which is fixed a bearing-plate $b$ with a flange having a conical inner surface $c$. The flange is provided with a lateral projection $d$, and a downward projection $e$ integral with the plate $b$ is provided with a lateral recess $f$ adapted to be engaged by a pin $g$ inserted into a hole in the support $h$ on which the bearing plate is mounted. The support $h$ is provided at its upper part with a conical surface $i$ and with a bifurcated lateral projection $k$ adapted to engage the projection $d$, as shown in Fig. 2.

For mounting the telescope on the support $h$ the plate $b$ is placed on the latter so that the surfaces $c$ and $i$ are in contact and the projection $k$ engages the projection $d$. Relative rotation of the instrument and support is thus prevented. To prevent the removal of the telescope from the support the end of the pin $g$ is inserted into the recess $f$. The parts referred to are only diagrammatically shown in the drawing.

In the example illustrated in Figs. 3 and 4, $l$ represents a panoramic telescope. The upper part of the instrument, containing the reflector for the incident rays, is marked $m$. The part $l$ is provided with a conical bearing surface $n$ and with a lateral projection $o$. The lower part $p$ of the instrument, being cylindrical fits in a bearing $v$ at $p$. A hooked projection $q$ of the part $p$ is adapted to retain the instrument in its support. The support is in this case the rack bar of a gun. The upper end of the rack bar is formed as a hollow and substantially cylindrical chamber, provided at $r$ with a conical bearing-surface for bearing surface $n$ of the telescope. A lateral projection $s$ of the chamber is provided with a recess $t$ adapted to engage the projection $o$. The conical part $r$ is provided with a gap $w$ (Fig. 4) which extends down the wall of the chamber for the passage of the ocular tube $x$ when the instrument is placed in position. The manner in which the telescope is mounted is similar to that described with reference to Figs. 1 and 2. The telescope $l$ is placed in the chamber on the rack bar in such a manner that the conical surfaces $n$ and $r$ are in contact and that the projection $o$ enters the recess $t$. The lower cylindrical part $p$ of the instrument enters the bearing $v$ and a pin $u$ is inserted into a hole slightly below the bearing $v$, and is then rotated in such a manner that it engages the hook $q$, as shown in Fig. 3.

Having now particularly described and ascertained the nature of my said invention and in what manner the same is to be performed, I declare that what I claim is:—

1. In a device for mounting sighting-telescopes a support provided with a circular bearing surface to receive a corresponding bearing surface in a member rigidly fixed to the telescope, and stop-members one adapted to interlock said support and said telescope so as to prevent rotation of the telescope on the circular bearing surface of the support and the other to interlock the telescope and the support so as to prevent removal of the telescope from the support, at least one of said support-members being adapted to be brought out of locking position, thereby freeing the telescope for removal from the support.

2. In a telescope a body member, an objective reflector rotatably mounted thereon, an ocular tube arranged at an angle to the axis of rotation of said objective reflector, the telescope body being provided with a circular bearing surface, the axis of said bearing surface being coincident with the axis of rotation of the objective reflector of the instrument.

3. In a telescope a body member, an objective reflector rotatably mounted thereon, an ocular tube arranged at an angle to the axis of rotation of said objective reflector, the telescope body being provided with a circular bearing surface, the axis of said bearing surface being coincident with the axis of rotation of the objective reflector of the instrument and a stop member extending radially from the body of the instrument.

4. A support for a panorama telescope provided with at least two concentric circular bearing surfaces one of which is interrupted by a gap for the passage of the ocular tube during the mounting of the telescope.

In testimony whereof I have signed this specification in the presence of two subscribing witnesses.

HEINRICH JACOB.

Witnesses:
  HENRY HASPER,
  WOLDEMAR HAUPT.